United States Patent
Bergmann et al.

(10) Patent No.: US 7,211,957 B2
(45) Date of Patent: May 1, 2007

(54) ALUMINO EARTH-ALKALI SILICATE GLASSES WITH HIGH THERMAL CAPACITY FOR LIGHT BULBS AND USE THEREOF

(75) Inventors: Hannelore Bergmann, Weisswasser (DE); Hans-Jurgen Bergmann, Weisswasser (DE)

(73) Assignee: Telux-Spezialglas GmbH, Weisswasser (DE)

( * ) Notice: Subject to any disclaimer, the term of this patent is extended or adjusted under 35 U.S.C. 154(b) by 345 days.

(21) Appl. No.: 10/905,345

(22) Filed: Dec. 29, 2004

(65) Prior Publication Data

US 2005/0099128 A1      May 12, 2005

Related U.S. Application Data

(63) Continuation-in-part of application No. 10/275,375, filed as application No. PCT/DE01/01725 on May 4, 2001, now abandoned.

(30) Foreign Application Priority Data

May 5, 2000   (DE) ................. 100 22 769

(51) Int. Cl.
  *H01J 17/16*  (2006.01)
  *H01J 61/30*  (2006.01)
(52) U.S. Cl. ................ 313/636; 313/579; 501/64; 501/67; 501/70
(58) Field of Classification Search ............... 313/636, 313/569, 578, 579; 501/64, 67, 70
See application file for complete search history.

(56) References Cited

U.S. PATENT DOCUMENTS 4,060,423 A * 11/1977 Thomas .................. 501/70
4,163,171 A    7/1979  Wurster .................. 313/221
4,724,021 A *  2/1988  Martin et al. .......... 156/89.14
5,508,237 A *  4/1996  Moffatt et al. ............ 501/69
6,069,100 A    5/2000  Naumann et al. .......... 501/67
6,074,969 A    6/2000  Naumann et al. .......... 501/64
6,373,193 B1   4/2002  Marlor et al. ............ 313/636

* cited by examiner

*Primary Examiner*—Nimeshkumar D. Patel
*Assistant Examiner*—Kevin Quarterman
(74) *Attorney, Agent, or Firm*—Gudrun E. Huckett

(57) ABSTRACT

An alumino earth-alkali silicate glass for lamp bulbs of tungsten halogen incandescent lamps has the following glass composition (% by weight) that reduces discoloration during operation of the lamp bulb:

| | |
|---|---|
| $SiO_2$ | 55.0–62.5 |
| $Al_2O_3$ | 14.5–18.5 |
| $B_2O_3$ | 0.8–4.0 |
| BaO | 7.5–17.0 |
| CaO | 6.5–13.5 |
| MgO | 1.0–5.5 |
| SrO | 0–2.0 |
| $ZrO_2$ | 0–1.5 |
| $TiO_2$ | 0–1.0 |
| ZnO | 0–0.5 |
| $CeO_2$ | 0–0.3 |
| $R_2O$ | <0.03 |
| $H_2O$ | 0.025–0.042. |

2 Claims, No Drawings

ALUMINO EARTH-ALKALI SILICATE GLASSES WITH HIGH THERMAL CAPACITY FOR LIGHT BULBS AND USE THEREOF

This application is a continuation-in-part application of application Ser. No. 10/275,375, now abandoned, having a filing date (35 U.S.C. 371) of Mar. 28, 2003, which is a national stage application of PCT/DE01/01725 having an international filing date of May 4, 2001.

BACKGROUND OF THE INVENTION

The present invention relates to alumino earth-alkali silicate glasses for molybdenum-glass fusions in the form of light bulbs as the outer casing for lamps, in particular, for lamps with regenerative halogen cycle and bulb temperatures of from above 550° C. up to 700° C.

It is known that the stability of the regenerative halogen cycle in halogen lamps is the prerequisite for reaching the target lamp life of a halogen lamp. Decisive for this is that the equilibrium between formation and decomposition of tungsten halides is maintained. Disruptions of the halogen cycle, inter alia, can be caused by smallest amounts of contaminations in the glass as well as in the filament material or the feed-through sleeve material. These contaminations, inter alia, can weaken the halogen cycle as a result of the high lamp temperatures as well as the energy-rich radiation of the tungsten filament so that metallic tungsten will form a black precipitate on the inner side of the bulb. This causes a weakening of the lamp efficiency and light translucence. It is a well-known fact that particularly alkali ions have such a disruptive effect on the halogen cycle. For this reason, industrial scale halogen lamp glasses are practically free of alkali, which recently has resulted in alkali oxide contents ($R_2O$) of <0.03% by weight, inasmuch as no stabilizing components partially compensate their effect. In addition to the negative effect of the alkali ions, other components such as $H_2$, $OH^-$, $CO$ and $CO_2$ are said to have an aggressive effect and to cause disruptions of the cycling process.

EP 0 913 366, DE 197 47 354, and U.S. Pat. No. 6,074,969 (same patent family) therefore limit the water contents for aluminoborosilicate glass containing alkaline earth metals employed in lamp bulbs to be operated at temperatures below 650 degrees C. to <0.02% by weight in order to prevent blackening of the lamp.

EP 0 913 365, DE 197 58 481, and U.S. Pat. No. 6,069,100 (same patent family, based on WO 99/14794) discloses aluminoborosilicate glass containing alkaline earth metals for lamp bulbs to be operated at temperatures above 650 degrees C. The references teach that the water contents must be less than 0.02% by weight because the water or the hydrogen ions are said to cause a disruptive effect on the halogen cycling process; discoloration of the glass at the operating temperatures of the lamp is to be prevented in this way.

U.S. Pat. No. 4,163,171 discloses a glass composition which is atypical for halogen lamp glasses ($SiO_2$ 50%, $P_2O_5$ 4.8%, and $Al_2O_3$ 19.2%) wherein the CO and alkali contents are practically zero and the water contents is limited to less than 0.03% by weight. Glasses of this type of composition however have practically not been used as halogen lamp glasses.

Numerous hart glasses which have been, and are being used, for halogen lamps, for example, glasses 180 made by General Electric; 1720, 1724, and 1725 made by Corning; as well as 8252 and 8253 made by a Schott, have water contents under 0.025% by weight, partially under 0.02% by weight. These glasses are within the composition range according to Table 1.

TABLE 1

| Oxides | % by weight |
|---|---|
| $SiO_2$ | 56.4–63.4 |
| $Al_2O_3$ | 14.6–16.7 |
| $B_2O_3$ | 0–5.0 |
| BaO | 7.5–17.0 |
| CaO | 6.7–12.7 |
| MgO | 0–8.2 |
| SrO | 0–0.3 |
| $ZrO_2$ | 0–1.1 |
| $TiO_2$ | 0–0.2 |
| $Na_2O$ | 0.02–0.05 |
| $K_2O$ | 0.01–0.02 |
| $Fe_2O_3$ | 0.03–0.05 |

The typical compositions of halogen lamp glasses in patents are within the range of Table 2.

TABLE 2

| Oxides | % by weight |
|---|---|
| $SiO_2$ | 52–71 |
| $Al_2O_3$ | 13–25 |
| $B_2O_3$ | 0–6.5 |
| BaO | 0–17 |
| CaO | 3.5–21 |
| MgO | 0–8.3 |
| SrO | 0–10 |
| $ZrO_2$ | 0–5.5 |
| $R_2O$ | 0–0.08 (1.2) |
| $TiO_2$ | 0–1 |
| Water | <0.025 |

Observing these limits, in particular of the low water contents, poses significant requirements with regard to the employed raw materials as well as the glass melting process, such as, for example:
use of dried raw materials and refuse glass;
water-free raw materials;
increased technical and thus financial expenditure for the apparatus technology and operation of the glass melting apparatus for obtaining melting temperatures above 1,600° C. with a low partial water vapor pressure above the molten glass.

There presently exists, and there will exist in the future, a significant demand for glasses for halogen lamps.

SUMMARY OF THE INVENTION

The object of the invention resides in providing glasses which can be produced economically more advantageously and which enable their use in lamps, in particular, in halogen lamps.

Surprisingly, and contrary to the present knowledge, it was found that alumino earth-alkali silicate glasses with a water contents of 0.025 to 0.042% by weight fulfill the requirements in regard to halogen lamp glass and do not exhibit disadvantages from these contaminations in regard to the halogen cycling process at bulb temperatures between 550 and 700° C. In glasses having a water contents of 0.025 to 0.042% by weight, the water contents does not act as a contamination in the sense of disturbing the equilibrium between formation and decomposition of tungsten halides.

Blackening of the inner surface of the bulb of the lamp does not occur or not to a greater degree compared to bulb glasses with a significantly reduced water contents.

The invention comprises all alumino earth-alkali silicate glasses which have the required properties for lamp bulbs used in tungsten halogen lamps, such as:
- the application of molybdenum as feed-through sleeve material and the compressive strains to be achieved in the glass by means of the thermal expansion coefficient;
- the high thermal softening of the glass which limits the upper lamp temperature:

| | |
|---|---|
| $\alpha_{20-400°\,C.}$ | $4.4-4.8* \ 10^{-6}\,K^{-1}$ |
| $T_{str}$ | 665–730° C. |
| $T_{soft}$ | 925–1020° C. |

In a preferred embodiment of the invention, the alumino earth-alkali silicate glass has the following composition (% by weight):

| | |
|---|---|
| $SiO_2$ | 55.0–62.5 |
| $Al_2O_3$ | 14.5–18.5 |
| $B_2O_3$ | 0.8–4.0 |
| BaO | 7.5–17.0 |
| CaO | 6.5–13.5 |
| MgO | 1.0–5.5 |
| SrO | 0–2.0 |
| $ZrO_2$ | 0–1.5 |
| $TiO_2$ | 0–1.0 |
| ZnO | 0–0.5 |
| $CeO_2$ | 0–0.3 |
| $R_2O$ | <0.03 |
| $H_2O$ | 0.025–0.042 |

The glasses according to the invention enable their use in halogen lamps in temperature ranges of the bulb between 550 and 700° C., do not exhibit the disadvantages of contaminations, for example, water, for the halogen cycle in comparison to water-poor glasses, and, in regard to manufacture, have economic advantages relative to the marketable glasses of the prior art.

Experiments in regard to the effect of the water contents on alumino earth-alkali silicate glasses show surprisingly the following results:
- reduction of the liquidus temperature by, on average, 10 to 15 K in the composition range in comparison to the processing temperature in the tube forming range;
- reduction of the viscosity temperatures in the viscosity range $10^{13.0}$ to $10^{14.5}$ by, on average, 6 to 14 K while maintaining the viscosity temperatures in the processing range.
- improvement of the melting behavior of the glasses in the flame during melting and fusing.

Based on these results, significant economic advantages for the industrial scale manufacture of halogen lamp glasses can be derived. These are:
- use of energy-efficient melting processes for the molten glass of halogen lamp glasses, such as "oxy-fuel melter" with significant product-specific energy savings;
- energy savings by lowering the melting temperatures for the molten glass with simultaneous reduction of wear on refractory material of the melting devices;
- yield increase for glass tube manufacture by complete avoidance crystallization of the glasses during the tube forming step as a result of the lowering of the liquidus temperature relative to the processing temperature;
- use of water-containing glass raw materials;
- increase of the processing speeds in the lamp manufacture as a result of "steeper" temperature-viscosity-course of the glass."

Generally, earth-alkali alumino silicate glasses have a strong tendency to crystallize in the temperature ranges at which they are processed, for example, to tubes. Actually, the tube forming temperature is right within the range of greatest crystallization. This is a very detrimental property of such glasses. The crystallization range is defined by the liquidus temperature. Crystallization within the glass is always a flaw causing the product to be discarded because it cannot be ensured that a halogen lamp made from such a flawed glass could withstand the operating conditions. In practice, it has been attempted to perform the tube forming step at temperatures that are above liquidus temperature, i.e., to adjust the glass composition such that crystallization is prevented. This goal has been achieved by the present invention in that the water content of the glass in the claimed range lowers the liquidus temperature on average by 10 to 15 K relative to the temperature of the tube forming step so that the inventive glasses have a great crystallization resistance.

The earth-alkali alumino silicate glasses be improved by the present invention are glasses having a very steep temperature/viscosity characteristic line, i.e., the viscosity range available for processing the glass to form the lamp is exhausted very quickly and requires, in addition to very high temperatures, especially a very short processing time for manufacturing lamps. Higher discard rates are therefore the result in lamp manufacture with such prior art glasses. By means of the present invention, the reduction of the viscosity temperatures of the glasses in the viscosity range $10^{13.0}$ to $10^{14.5}$ by, on average, 6 to 14 K is achieved while the viscosity temperatures in the processing range is maintained. The inventors have found that the higher water content within the claimed range causes the steep viscosity/temperature course to become more flat so that the lamp manufacture in regard to the melting process is simplified. The inventive glasses thus provide a significant advantage over the prior art glass compositions.

The present invention improves the melting behavior of the glasses in the flame during melting and fusing. It was found that a higher water contents increases the spectral absorption in the IR range, and this leads to an increase of the glass temperature during melting as a result of the flame action of the melting device (at identical thermal burner load). It is thus possible with the water contents of the claimed range to increase the processing speed during lamp manufacture while at the same time the burner load can be reduced. This constitutes an important advantage of lamp manufacture.

The use of energy-efficient melting processes for the molten glass of halogen lamp glasses, such as "oxy-fuel melter" with significant product-specific energy savings is possible, as well as energy savings by lowering the melting temperatures for the molten glass with simultaneous reduction of wear on refractory material of the melting devices. Producing earth-alkali alumino silicate glasses requires melting temperatures of 1620 to 1680 degrees C., depending on the composition. Conventional melting processes (air-fuel melter with electric boosting or bubbling) can reach these temperatures only with enormously high technical expenditure and are moreover not stable in the upper load range. Therefore, the melting process as well as a high glass quality are difficult to control.

So-called oxy-fuel melters with or without electric boosting/bubbling lead to a higher partial pressure of water in the furnace atmosphere as a result of the combustion technology and this leads in turn to a higher water contents in the glass. The water contents claimed in the present invention corresponds to this water contents range and does not cause blackening of the halogen lamp. The use of such modern melting processes lowers the specific energy consumption (kWh per kg glass) by 15 to 20% while at the same time the melting temperature is lowered by appr. 15 to 20 K. This in turn leads to a reduced loading of the refractory materials and thus to an extended service life of the melting devices. Also, the modern melting processes provide for a high process stability even at highest crucible temperatures and thus provide high glass quality. The economic advantages are thus very important.

The invention also enables the use of water-containing starting materials. Water-containing raw materials improve the melting properties of the raw materials mixture and are usually cheaper than water-reduced or water-free raw materials. This is a further advantage of the glasses according to the invention.

PREFERRED EMBODIMENTS OF THE INVENTION

The present invention will be explained in more detail with the aid of the following embodiments.

In order to ensure a direct application, examples of glasses were melted in a glass melting vessel of a contents of 3.5 metric tons, and, subsequently, tubes were drawn. The glass melting vessel was equipped with a combination gas-oxygen or gas-air heating system so that gas-oxygen heating or gas-air heating as well as combination variants could be used for heating. In this way it was possible to vary and adjust the water contents of the glass by means of the partial pressure of the furnace atmosphere.

The employed raw materials were: quartz powder; aluminum oxide; hydrated alumina; boric acid; calcium carbonate, barium carbonate, and strontium carbonate; magnesium oxide; zirconium silicate; titanium oxide; zinc oxide; and cerium oxide. The raw materials were poor in alkali and had technical purity. Water-containing raw materials, such as aluminum hydroxide, were introduced in order to be able to control the water contents of the glasses additionally. Raw materials and refuse glass were used dried or moist.

The glass melting vessel is equipped additionally with auxiliary devices, in order to blow water vapor directly into the molten glass—a further possibility to change the water contents of the glass.

In this way it was possible to vary:

the glass composition;

the water contents; and the melting conditions, such as melting temperatures and melting duration, within the context of the object of the invention.

The glasses were melted at temperatures between 1600 and 1660° C., refined, and homogenized. The tubes manufactured therefrom were free of flaws in the glass and matched the size required for lamp manufacture. Halogen lamps were produced from the tubes and subjected to lamp life tests. The electrode material was categorically annealed, in order to eliminate its effect on the halogen cycling process.

Glass compositions and important glass properties of the melted glasses (A) of the examples were compared with known water-reduced glasses (V). The comparative results are combined in Table 3.

TABLE 3

Glass Composition and Properties of the Examples A and Comparative Examples V

| Oxides | % by weight | A1 | V1 | A2 | V2 | A3 | V3 | A4 | V4 |
|---|---|---|---|---|---|---|---|---|---|
| $SiO_2$ | | 59.4 | 59.4 | 55.5 | 55.5 | 60.8 | 60.8 | 60.4 | 60.4 |
| $Al_2O_3$ | | 16.0 | 16.0 | 17.6 | 17.6 | 16.2 | 16.2 | 16.4 | 16.4 |
| $B_2O_3$ | | 1.7 | 1.7 | 4.0 | 4.0 | 0.8 | 0.8 | 1.9 | 1.9 |
| BaO | | 11.1 | 11.1 | 8.7 | 8.7 | 8.2 | 8.2 | 6.9 | 6.9 |
| CaO | | 9.5 | 9.5 | 7.8 | 7.8 | 11.1 | 11.1 | 11.3 | 11.3 |
| MgO | | 1.0 | 1.0 | 5.5 | 5.5 | 1.2 | 1.2 | 1.0 | 1.0 |
| SrO | | | | 0.3 | 0.3 | | | 1.2 | 1.2 |
| $ZrO_2$ | | 1.0 | 1.0 | 0.2 | 0.2 | 1.5 | 1.5 | 0.2 | 0.2 |
| $TiO_2$ | | 0.2 | 0.2 | 0.1 | 0.1 | | | 0.3 | 0.3 |
| ZnO | | | | 0.2 | 0.2 | | | 0.3 | 0.3 |
| $CeO_2$ | | | | | | 0.2 | 0.2 | | |
| $R_2O$ | | 0.026 | 0.026 | 0.028 | 0.028 | 0.028 | 0.028 | 0.026 | 0.026 |
| Water | | 0.039 | 0.021 | 0.041 | 0.021 | 0.040 | 0.021 | 0.033 | 0.011 |
| α 20–400 | $10^{-6}K^{-1}$ | 4.50 | 4.51 | 4.44 | 4.45 | 4.41 | 4.42 | 4.43 | 4.45 |
| T str | ° C. | 700 | 710 | 675 | 683 | 710 | 718 | 707 | 712 |
| T ann | ° C. | 760 | 770 | 723 | 730 | 763 | 770 | 759 | 765 |
| T soft | ° C. | 987 | 990 | 929 | 930 | 990 | 993 | 982 | 984 |
| Twork | ° C. | 1294 | 1295 | 1198 | 1197 | 1303 | 1305 | 1291 | 1290 |
| T liqu | ° C. | 1181 | 1195 | 1138 | 1150 | 1217 | 1222 | 1215 | 1230 |
| KWG max | μm/min | 8 | 12 | 18 | 25 | 12 | 14 | 12 | 13 |

| Oxides | % by weight | A5 | V5 | A6 | V6 | A7 | V7 |
|---|---|---|---|---|---|---|---|
| $SiO_2$ | | 61.9 | 61.9 | 59.8 | 59.8 | 59.7 | 59.7 |
| $Al_2O_3$ | | 14.2 | 14.2 | 14.5 | 14.5 | 15.5 | 15.5 |
| $B_2O_3$ | | 0.8 | 0.8 | 1.0 | 1.0 | 1.1 | 1.1 |
| BaO | | 14.7 | 14.7 | 16.6 | 16.6 | 8.2 | 8.2 |
| CaO | | 6.7 | 6.7 | 6.5 | 6.5 | 12.2 | 12.2 |

TABLE 3-continued

| Glass Composition and Properties of the Examples A and Comparative Examples V | | | | | | | |
|---|---|---|---|---|---|---|---|
| MgO | | 1.2 | 1.2 | 1.4 | 1.4 | 1.2 | 1.2 |
| SrO | | 0.2 | 0.2 | | | 2.0 | 2.0 |
| ZrO$_2$ | | | | | | | |
| TiO$_2$ | | 0.2 | 0.2 | 0.2 | 0.2 | | |
| ZnO | | | | | | 0.1 | 0.1 |
| CeO$_2$ | | 0.1 | 0.1 | | | | |
| R$_2$O | | 0.029 | 0.029 | 0.029 | 0.029 | 0.024 | 0.024 |
| Water | | 0.039 | 0.019 | 0.025 | 0.018 | 0.026 | 0.018 |
| α 20–400 | $10^{-6}K^{-1}$ | 4.47 | 4.46 | 4.39 | 4.40 | 4.54 | 4.53 |
| T str | °C. | 723 | 735 | 719 | 723 | 708 | 716 |
| T ann | °C. | 775 | 784 | 773 | 779 | 767 | 774 |
| T soft | °C. | 1017 | 1018 | 1011 | 1014 | 993 | 997 |
| Twork | °C. | 1366 | 1367 | 1363 | 1365 | 1300 | 1302 |
| T liqu | °C. | 1190 | 1199 | 1191 | 1200 | 1199 | 1211 |
| KWG max | μm/min | 5 | 8 | 7 | 8 | 12 | 15 |

KWG in Table 3 = crystallization growth rate.

As can be taken from Table 3, the different glass compositions have different softening behavior relative to the maximum permissible bulb temperature in the lamp. For this reason, high-performance lamps were produced of glasses with high softening temperatures and regular-load lamps of glasses with low softening temperature. The results of the lamp life test of the halogen lamps were evaluated with regard to blackening (spot formation on the inner surface of the bulb) and luminous flux drop. The lamp life was between 135 and 720 hours, depending on the lamp type. The results are combined in Table 4.

TABLE 4

| Results of Lamp Life Test on Halogen Lamps | | | | | | | | |
|---|---|---|---|---|---|---|---|---|
| | A1 | V1 | A2 | V2 | A3 | V3 | A4 | V4 |
| A) | 2.4 | 1.9 | 4.7 | 4.5 | 2.3 | 2.2 | 3.7 | 3.5 |
| B) with blackening | 0 | 0 | 3 (minimal) | 2 (minimal) | 0 | 0 | 1 (minimal) | 2 (minimal) |
| B) without blackening | 20 | 20 | 17 | 18 | 20 | 20 | 19 | 18 |

| | A5 | V5 | A6 | V6 | A7 | V7 |
|---|---|---|---|---|---|---|
| A) | 6.4 | 5.9 | 5.5 | 5.6 | 2.4 | 2.4 |
| B) with blackening | 3 (medium) 2 (minimal) | 3 (medium) 1 (minimal) | 2 (minimal) | 1 (minimal) | 2 (minimal) | 2 (medium) |
| B) without blackening | 15 | 16 | 18 | 19 | 18 | 18 |

A) luminous flux drop/average of 20 lamps in %, respectively;
B) blackening/number based on 20 lamps, respectively.

In order to double-check the results of the halogen lamp tests, further tests were performed and the results are compiled in Table 5, wherein:

| | A1 | V1 | A2 | V2 | A3 | V3 | A4 | V4 |
|---|---|---|---|---|---|---|---|---|
| A) total gas release % | 0.969 | 1 | 1.043 | 1 | 0.998 | 1 | 0.932 | 1 |
| B) total contents in ppm | 392 | 211 | 410 | 208 | 401 | 211 | 332 | 114 |
| B) release in ppm | 3 | 3 | 5 | 4 | 3 | 2 | 3 | 2 |
| B) release in % | 0.9 | 1.4 | 1.3 | 1.9 | 0.8 | 1.0 | 1.0 | 1.8 |

| | A5 | V5 | A6 | V6 | A7 | V7 |
|---|---|---|---|---|---|---|
| A) total gas release % | 0.992 | 1 | 1.004 | 1 | 1.002 | 1 |
| B) total contents in ppm | 394 | 193 | 249 | 180 | 260 | 182 |

| -continued | | | | | | |
|---|---|---|---|---|---|---|
| B) release in ppm | 7 | 5 | 4 | 3 | 5 | 4 |
| B) release in % | 1.8 | 2.6 | 1.6 | 1.7 | 1.2 | 2.2 |

A) high-vacuum degassing test (gas release) in the temperature range of 900 ... 1,600° C. for determining the gas contents of the glasses in high vacuum )at $10^{-4}$ Pa).
B) determination of water release of the glasses at the lower stress relief temperature $T_{str}$ under vacuum in comparison to the total water contents in percent (infrared spectroscopy); (120 hours, $1 \cdot 10^{-1}$ mbar).

The results show that for absolute gas release under high vacuum as well as for the water release at $T_{str}$ no significant differences are present for glasses with low or high water contents. The trend of these results coincides with those of lamp life tests of the halogen lamps. The water release of glasses with a higher water contents (0.025 ... 0.042% by weight) is not greater than for glasses with significantly lower water contents. The same holds true for the total gas release of the glasses. The results of the lamp life tests of the halogen lamps show that there is no significant difference between the use of glasses with high or less high water contents with respect to lamp life (failure, luminous flux drop, blackening). By means of the use of glasses with higher water contents and their proven suitability in the application of halogen lamps, the aforementioned economic advantages in regard to the manufacture of the glass, of the glass tubes, and the halogen lamps can be utilized completely. This relates to the glasses within the broad protected range of composition.

While specific embodiments of the invention have been shown and described in detail to illustrate the inventive principles, it will be understood that the invention may be embodied otherwise without departing from such principles.

What is claimed is:

1. An alumino earth-alkali silicate glass for lamp bulbs of tungsten halogen incandescent lamps having the following glass composition (% by weight):

| | |
|---|---|
| $SiO_2$ | 55.0–62.5 |
| $Al_2O_3$ | 14.5–18.5 |
| $B_2O_3$ | 0.8–4.0 |
| BaO | 7.5–17.0 |
| CaO | 6.5–13.5 |

| -continued | |
|---|---|
| MgO | 1.0–5.5 |
| SrO | 0–2.0 |
| $ZrO_2$ | 0–1.5 |
| $TiO_2$ | 0–1.0 |
| ZnO | 0–0.5 |
| $CeO_2$ | 0–0.3 |
| $R_2O$ | <0.03 |
| $H_2O$ | 0.025–0.042. |

2. A lamp bulb for tungsten halogen incandescent lamps operating at temperatures of above 550° C. up to 700° C., wherein the lamp bulb is comprised of an alumino earth-alkali silicate glass having the following glass composition (% by weight):

| | |
|---|---|
| $SiO_2$ | 55.0–62.5 |
| $Al_2O_3$ | 14.5–18.5 |
| $B_2O_3$ | 0.8–4.0 |
| BaO | 7.5–17.0 |
| CaO | 6.5–13.5 |
| MgO | 1.0–5.5 |
| SrO | 0–2.0 |
| $ZrO_2$ | 0–1.5 |
| $TiO_2$ | 0–1.0 |
| ZnO | 0–0.5 |
| $CeO_2$ | 0–0.3 |
| $R_2O$ | <0.03 |
| $H_2O$ | 0.025–0.042. |

* * * * *